United States Patent
Takano et al.

(10) Patent No.: US 6,526,771 B2
(45) Date of Patent: Mar. 4, 2003

(54) FREEZING CYCLE APPARATUS (75) Inventors: Yoshiaki Takano, Kosai (JP); Satoshi Izawa, Anjo (JP)

(73) Assignee: Denso Corporation, Kariya (JP)

( * ) Notice: Subject to any disclaimer, the term of this patent is extended or adjusted under 35 U.S.C. 154(b) by 58 days.

(21) Appl. No.: 09/799,459

(22) Filed: Mar. 6, 2001

(65) Prior Publication Data

US 2001/0022090 A1 Sep. 20, 2001

(30) Foreign Application Priority Data

Mar. 15, 2000 (JP) ........................................ 2000-077831

(51) Int. Cl.[7] ............................. F25B 1/00; F25B 49/00
(52) U.S. Cl. ..................................... 62/228.3; 62/228.5
(58) Field of Search ............................. 62/228.3, 228.5, 62/229, 160

(56) References Cited

U.S. PATENT DOCUMENTS 4,653,288 A * 3/1987 Sayo et al. .................... 62/210
5,557,941 A * 9/1996 Hanson et al. ............. 62/229 X
5,685,160 A   11/1997 Abersfelder et al. ........ 62/228.5
6,148,632 A   11/2000 Kishita et al. .......... 62/196.4 X

FOREIGN PATENT DOCUMENTS

| DE | 197 46 773 A1 | 5/1998 | ............ B60H/1/32 |
| DE | 199 19 104 | 11/1999 | ............ F25D/31/00 |
| EP | 0 894 651 A2 | 2/1999 | ............ B60H/1/00 |
| EP | 0 960 755 A1 | 12/1999 | ............ B60H/1/00 |
| EP | 1 074 800 | 2/2001 | ............ F25B/49/02 |

* cited by examiner

Primary Examiner—William Wayner
(74) Attorney, Agent, or Firm—Harness, Dickey & Pierce, PLC

(57) ABSTRACT

In a freezing cycle apparatus that switches between a cooling mode and a heating mode, wherein a low-pressure refrigerant is evaporated in an evaporator 18 for cooling the air during a cooling mode and a hot gas refrigerant is introduced from the discharge side of a compressor 10 directly into the evaporator 18. A variable displacement type compressor capable of varying the displacement is used as the compressor 10. The displacement of the compressor 10 is controlled such that the refrigerant flow rate in the cooling or heating cycle is a predetermined target flow rate during the cooling and the heating mode.

13 Claims, 9 Drawing Sheets

FREEZING CYCLE APPARATUS

CROSS-REFERENCE TO RELATED APPLICATION

The present invention is related to Japanese patent application No. 2000-77831, filed Mar. 15, 2000; the contents of which are incorporated herein by reference.

FIELD OF THE INVENTION

The present invention relates to a freezing cycle apparatus that uses an evaporator as a radiator for discharged hot gas from a compressor during heating, and more particularly, to a freezing cycle apparatus which uses a variable displacement type compressor.

BACKGROUND OF THE INVENTION

In the vehicular air conditioner of the prior art, during heating in winter, hot water (e.g., the engine cooling water) is circulated in a heat exchanger for heating, in which the conditioned air is heated with the hot water. When the temperature of the hot water is low, the air blown into the compartment may fail to heat properly. In Unexamined Published Japanese Patent Application No. 11-101514, a freezing cycle apparatus warms with the hot gas heater. Here, when the temperature of the hot water is lower than a predetermined temperature during engine starting, gas refrigerant (or hot gas) discharged from the compressor is introduced into the evaporator while bypassing a condenser to release heat in the evaporator from the gas refrigerant to the conditioned air.

However, in the heating mode of the hot gas heater, the high-low pressure of the freezing cycle rises higher than that of the cooling mode. If the heating ability and the high pressure are controlled by interrupting compressor operation, mechanical shock causes uncomfortable vibrations and reduces durability of the compressor's electromagnetic clutch. Therefore, the prior art proposed using a variable displacement compressor.

This compressor maintains the evaporator at a predetermined temperature (e.g., 0° C.) during cooling. Therefore, if the evaporator temperature rises, the displacement is enlarged to lower the intake pressure. If the evaporator temperature drops, the displacement is reduced to increase suction pressure.

During the heating mode, the evaporator temperature is raised by rising the discharge pressure to augment the heating ability. Therefore, the displacement must be reduced by raising the discharge pressure, and the displacement has to be augmented by lowering the discharge pressure.

Thus, displacement control during cooling and heating must be different. Therefore, a displacement control valve mechanism and the cooling/heating switching valve mechanism are added to the displacement control valve mechanism for the cooling mode with the ordinary variable displacement compressor. The addition, these two valve mechanisms inevitably raises the cost of the variable displacement type compressor.

SUMMARY OF THE INVENTION

To address these and other drawbacks, the present invention provides a freezing cycle apparatus with a hot gas heater function, where cooling and heating are correlated to the flow rate of refrigerant circulating in the cycle. During the freezing cycle, moreover, there is a portion where refrigerant flows both during heating and cooling. In this portion, the refrigerant flow rate is detected by a flow rate detecting means shared for cooling and heating operations.

In one aspect of the invention, a freezing cycle apparatus is provided that switches between a cooling mode and a heating mode, where low-pressure refrigerant is evaporated in an evaporator for cooling air and hot gas refrigerant is introduced from the discharge side of a compressor directly into said evaporator to release heat in said evaporator. The apparatus uses a variable displacement type compressor. The displacement of the compressor is controlled such that the refrigerant flow rate in the cycle has a predetermined target flow rate during cooling and heating.

Accordingly, the compressor displacement may be controlled to set the predetermined target refrigerant flow rate during cooling or heating. Therefore, the displacement can be controlled by the control mechanism shared between the cooling and heating modes.

In another aspect of the invention, target flow rate determining means determines target flow rates during heating and cooling modes. Flow rate detecting means detects the refrigerant flow rates during heating and cooling modes. A displacement control means controls the displacement of said compressor so that the refrigerant flow rate, as detected by said flow rate detecting means, may be said target flow rate.

In another aspect, a valve means switches the refrigerant passages such that the gas refrigerant on the discharge side of said compressor is introduced directly to the side of said evaporator in said heating mode and to the side of a condenser in said cooling mode. The flow rate detecting means is arranged between the discharge side of said compressor and said valve means. Then, the refrigerant flow rate on the discharge side of the compressor can be detected by the flow rate detecting means shared between heating and cooling modes.

In another aspect, the flow rate detecting means includes a throttle portion arranged on the discharge side of said compressor, differential pressure detecting means that detects the differential pressure across said throttle portion, and flow rate calculation means that calculates the refrigerant flow rate based on the detected differential pressure.

As a result, the refrigerant flow rate can be calculated based on the differential pressure across the throttle on the discharge side of the compressor. Especially, the throttle portion is arranged on the compressor discharge side, so that the differential pressure necessary for the flow rate calculation can be achieved even if the throttling of the passage is smaller than where the throttle portion is on the cycle lower pressure side.

In another aspect, said predetermined target flow rate is determined such that the temperature of said evaporator is the target temperature.

Accordingly, cooling is controlled by controlling the displacement of the compressor so that the temperature of the evaporator is the target temperature during the cooling mode.

In another aspect, during said heating mode, said predetermined target flow rate is determined such that the cycle high pressure is the target pressure. As such, the heating ability can be controlled by controlling the displacement of the compressor so that the cycle high pressure is the target pressure during the heating mode.

In another aspect, the variable displacement compressor includes a displacement control mechanism and has a throttle portion disposed on the discharge side of said compressor; a differential pressure responding mechanism portion disposed in said displacement control mechanism for varying the displacement of said compressor according to the differential pressure across said throttle portion and the target differential pressure; a target differential pressure setting portion disposed in said displacement control mechanism for setting said target differential pressure by establishing a force against the differential pressure across said throttle portion; cooling time target differential pressure determining means for determining said target differential pressure at said cooling mode by varying the force against the differential pressure across said throttle portion; and heating time target differential pressure determining means for determining said target differential pressure at said heating mode by varying the force against the differential pressure across said throttle portion.

As a result, the compressor displacement can be varied directly mechanically according to the differential pressure across the throttle portion on the compressor discharge side and the target differential pressure by the differential pressure responding mechanical portion of the displacement control mechanism. The differential pressure across the throttle portion on the compressor discharge side varies corresponding to the refrigerant flow rate so that the refrigerant flow rate can be controlled by the displacement control according to the differential pressure change. The displacement is mechanically varied directly in response to the differential pressure change. Moreover, it is possible to improve the responsiveness of the displacement control to the change in the compressor speed.

Since the target differential pressures corresponding to cooling and heating are determined, respectively, by the cooling time target differential pressure determining means and the heating time target differential pressure determining means. Moreover, the compressor displacement can be controlled to achieve the abilities (or the refrigerant flow rates) necessary for cooling and heating. Therefore, it is sufficient to provide the displacement control mechanism shared for cooling and heating. In another aspect, the throttle portion is built in said compressor. In another aspect, during the cooling mode, said target differential pressure is determined such that the temperature of said evaporator is the target temperature. As a result, the displacement of the compressor is controlled to control the temperature of the evaporator to the target temperature during the cooling mode.

In another aspect, during said heating mode, said target differential pressure is determined such that the cycle high pressure is the target pressure. As a result, the displacement of the compressor is controlled to control the cycle high pressure to the target pressure during the heating mode.

In another aspect, the target temperature of said evaporator is varied according to the information indicating the cooling load. Then, the target temperature of the evaporator can be lowered by augmenting the cooling load and raised by reducing the cooling load.

In another aspect, the target pressure of said cycle high pressure is varied according to the heating load. Then, the target pressure of the cycle high pressure can be raised by augmenting the heating load and lowered by reducing the heating load.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein.

DETAILED DESCRIPTION OF THE INVENTION

Figure 1:
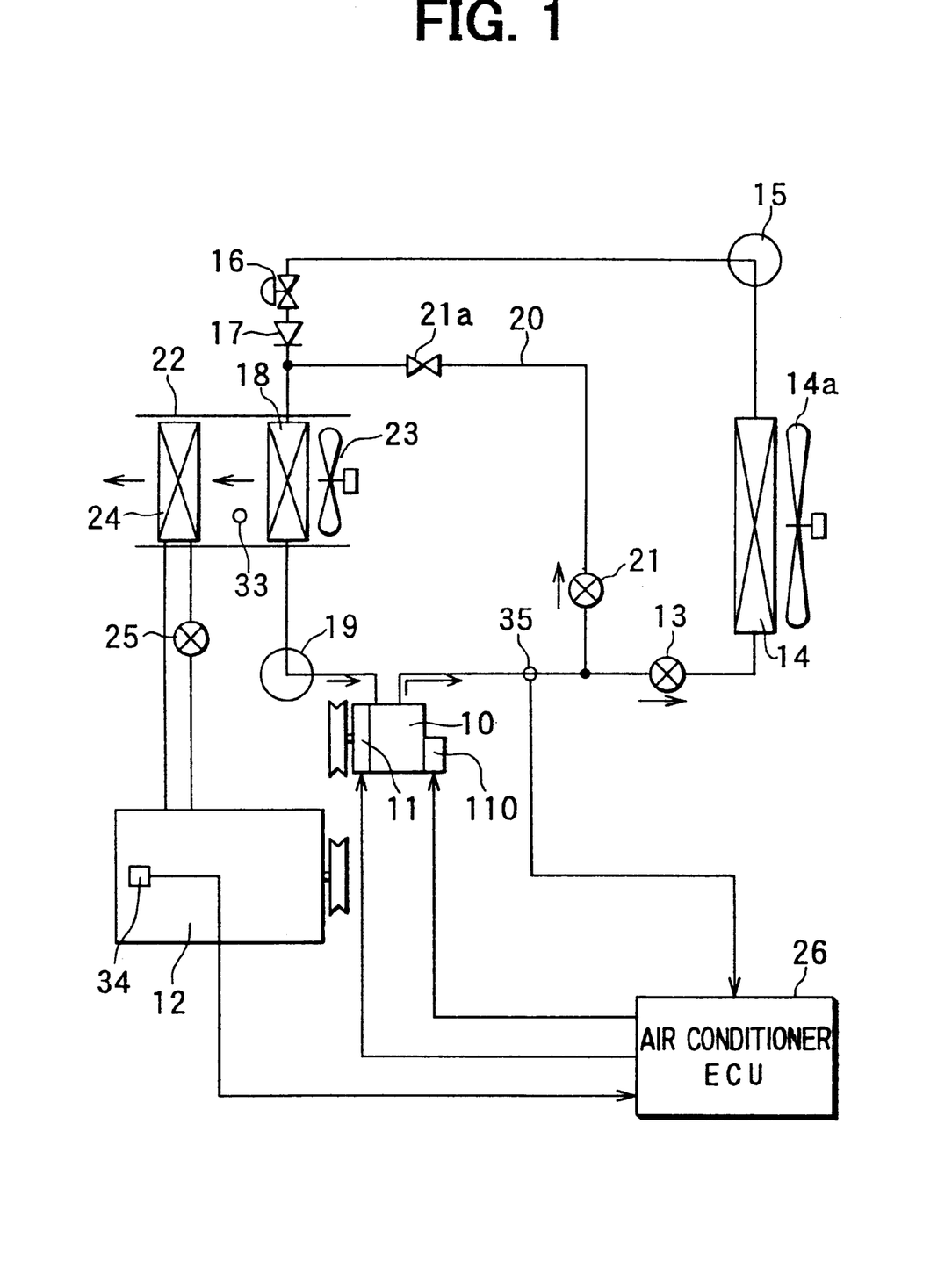
FIG. 1 is a schematic view showing a first embodiment of the present invention.

FIG. 1 shows a first embodiment of the present invention, applied to a freezing cycle device in a vehicular air conditioner. A compressor 10 is driven through an electromagnetic clutch 11 by a water-cooled type vehicular engine 12, and is constructed of a variable displacement type swash plate compressor.

The compressor 10 is connected on its discharge side through a cooling electromagnetic valve (or first valve means) 13 to a condenser 14, which is connected on its exit side to a receiver 15 for separating the gas and liquid of refrigerant to reserve the liquid refrigerant. To the condenser 14, cooling air (or ambient air) is blown by an electric type cooling fan 14a.

Moreover, the receiver 15 is connected on its exit side to a temperature type expansion valve (or a first pressure reducing unit) 16. This temperature type expansion valve 16 is connected on its exit side through a check valve 17 to the entrance of an evaporator 18. This evaporator 18 is connected on its exit side through an accumulator 19 to the intake side of the compressor 10.

The temperature type expansion valve 16 adjusts the valve opening (or refrigerant flow rate), as well known in the art, so that the degree of overheat of the refrigerant at the exit of the evaporator 18 may be kept at a predetermined value during operation of the ordinary freezing cycle (during the cooling mode). The accumulator 19 separates the gas and liquid of the refrigerant and reserves the liquid refrigerant so that the gas refrigerant and a small quantity of liquid refrigerant (in which oil is dissolved) in the vicinity of the bottom portion may be drawn into the side of the compressor 10.

Between the discharge side of the compressor 10 and the entrance side of the evaporator 18, on the other hand, a hot gas bypass passage 20 is interposed for bypassing the condenser 14. This bypass passage 20 is provided with a heating electromagnetic valve (or second valve means) 21 and a throttle (or second pressure reducing unit) 21a in series. This throttle 21a can be constructed of a fixed throttle such as an orifice or a capillary tube.

The evaporator 18 is disposed in an air conditioner casing 22 of the vehicular air conditioner and exchanges heat with air (e.g., compartment or ambient air) blown by an electric air conditioning blower 23. During the cooling mode, the low-pressure refrigerant in the evaporator 18 cools blown air by absorbing heat from the blown air by evaporating refrigerant. During heating, on the other hand, the high-temperature refrigerant gas (i.e., hot gas) from the discharge side of the compressor 10 flows from the hot gas bypass passage 20 directly into the evaporator 18 and releases heat into the air so that the evaporator 18 acts as a radiator.

In the air conditioner casing 22, there is disposed on the air downstream side of the evaporator 18 a hot water type heat exchanger 24 for heating the blown air by using the hot water (or engine cooling water) from the vehicular engine 12 as a heat source. The conditioned air is blown into the compartment from the (not-shown) blow port disposed downstream of the heat exchanger 24. This heat exchanger 24 is provided with a hot water valve 25 in its hot water circuit that controls hot water flow. During the heating mode, the evaporator 18 acts as an auxiliary heating device, and the hot water type heat exchanger 24 acts as a main heating device.

Figure 2:
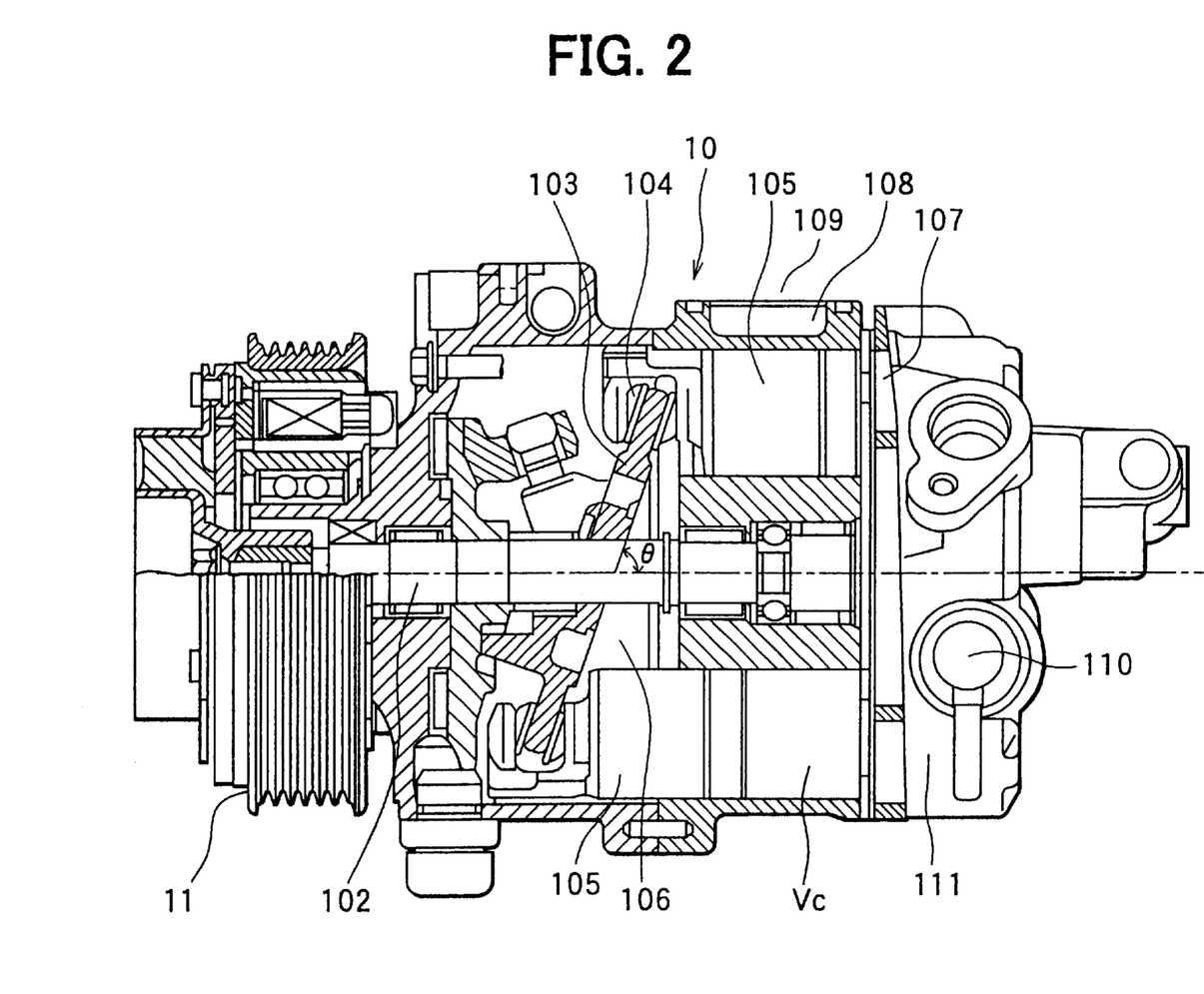
FIG. 2 is a longitudinal sectional diagram of a compressor of the first embodiment.

FIG. 2 shows a more detailed construction of the variable displacement type compressor 10, having a well-known variable displacement mechanism, where the vehicle engine 12 power is transmitted through the electromagnetic clutch 11 to a spindle 102. To a swash plate 103 inclined with respect to the spindle 102, a plurality of (e.g., six in this embodiment) pistons 105 through shoes 104 are connected.

By turning the swash plate 103 integrally with the spindle 102, therefore, the plurality of pistons 105 sequentially reciprocate through the shoes 104 to expand and contract the volumes of working chambers Vc to draw and compress the refrigerant.

Where the discharge of compressor 10 varies, moreover, the pressure in a swash plate chamber (or a control pressure chamber) 106 housing the swash plate 103, varies the inclination angle θ of the swash plate 103 thereby varying the stroke of pistons 105. Specifically, as the inclination angle θ decreases, the piston stroke increases to augment the displacement. As the inclination angle θ of the swash plate 103 increases, the piston stroke decreases to reduce the displacement. Here, the swash plate chamber 106 communicates with the inlet side of the compressor 10 through passage means having throttle means such as an orifice.

On the other hand, a first discharge chamber 107 collects and recovers the refrigerant, as discharged from the working chambers Vc of the individual pistons 105, and smoothes the discharge pulsations. A second discharge chamber 108 guides the refrigerant in the first discharge chamber 107 into a discharge port 109.

Figure 3:
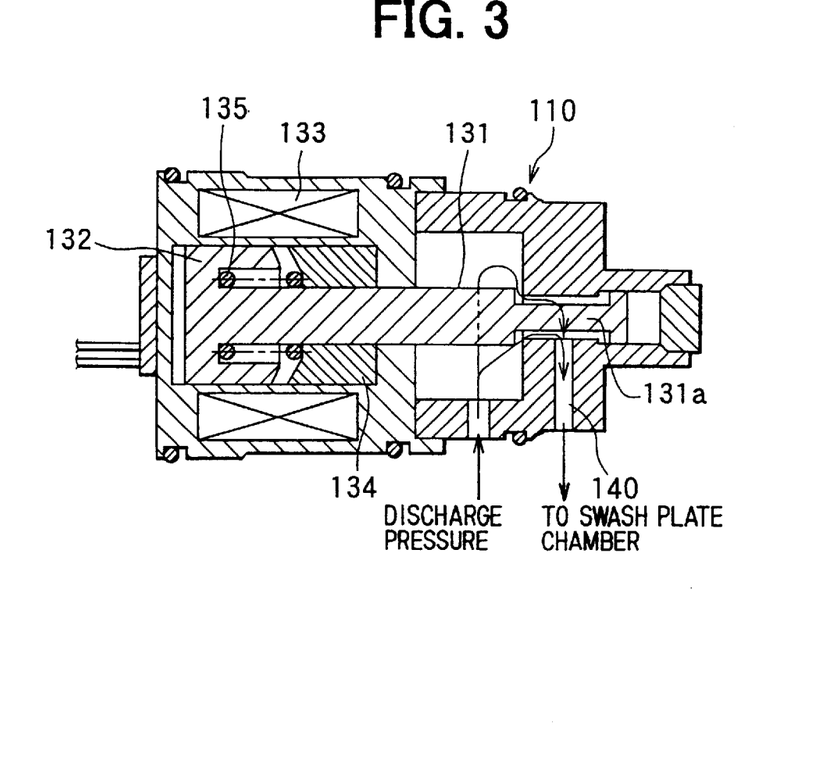
FIG. 3 is a longitudinal sectional diagram of a displacement control valve mechanism for the compressor of the first embodiment.

On the other hand, an electromagnetic type displacement control valve 110 constructs a displacement control mechanism for controlling the pressure in the swash plate chamber (or control pressure chamber) 106, and is arranged on a side of a rear housing 111 of the compressor 10. A specific example of the control valve 110 is shown in FIG. 3. The control valve 110 controls the communication state (or opening) of a control pressure passage 140 for introducing the discharge pressure of the compressor 10 into the swash plate chamber 106, with its valve member 131.

This valve member 131 is constructed integrally with a plunger (or movable iron core) 132, upon which an electromagnetic attracting force induced by an exciting coil 133 acts. Specifically, the plunger 132 is arranged to confront a stationary magnetic pole member (or stationary iron core) 134 through a predetermined spacing so that it is displaced in the axial direction (rightward of FIG. 3) toward stationary magnetic pole member 134 by the electromagnetic attracting force of the exciting coil 133. By this axial displacement of plunger 132, the valve member 131 moves toward a closed position. With the leading end of the valve member 131, there is integrally formed a guide rod 131a for guiding the axial movement of the valve member 131.

Between the plunger 132 and the stationary magnetic pole member 134, on the other hand, a coil spring 135 generates an elastic force against the electromagnetic force. Here, the displacement of the plunger 132 is so minute that the elastic force by the coil spring 135 can be deemed as a generally constant value irrespective of the displacement of the plunger 132.

Figure 4:
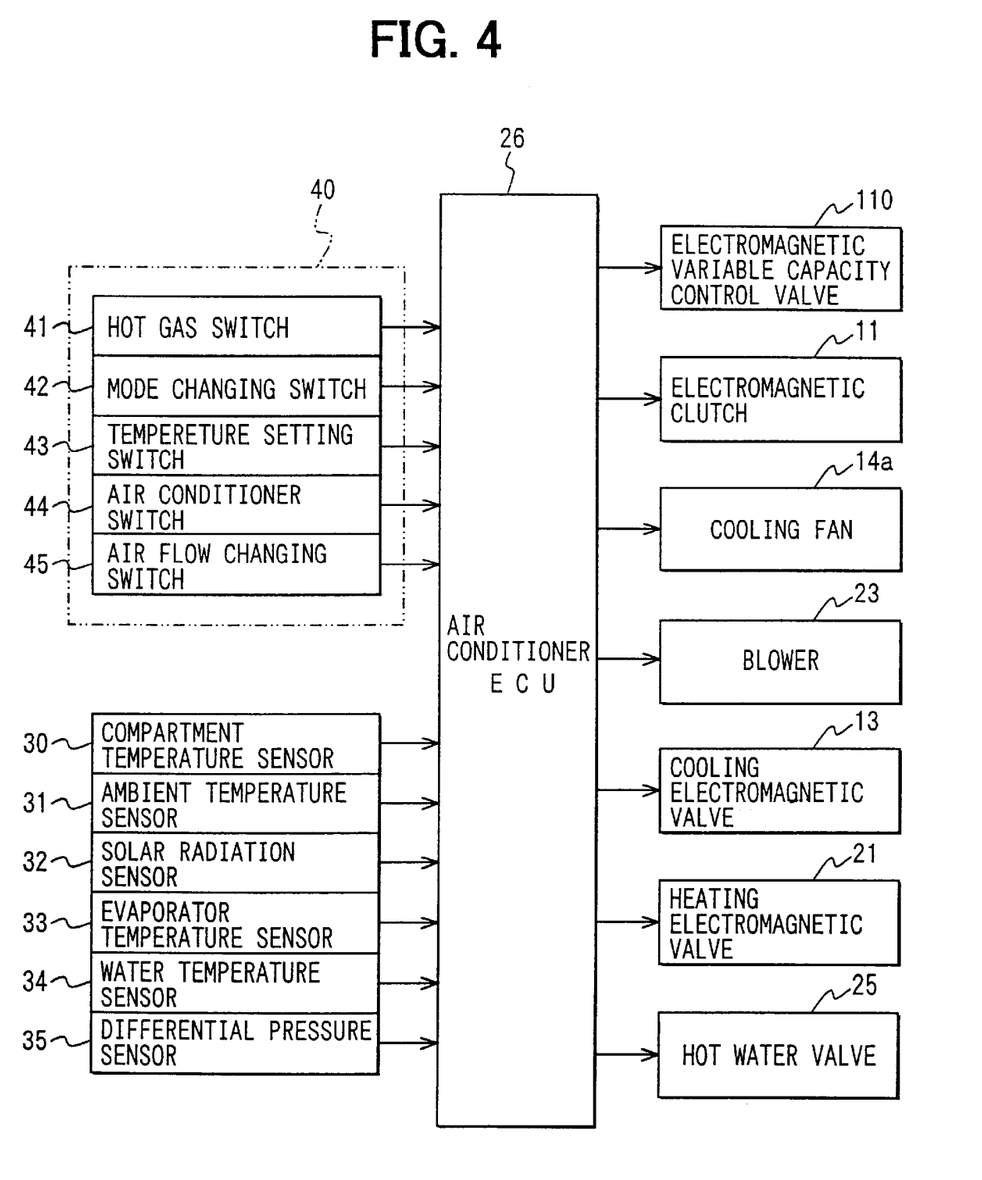
FIG. 4 an electric control block diagram for the first embodiment of the present invention.

In this embodiment, a duty ratio Dt, i.e., the interruption ratio of the electric current fed to the exciting coil 133, is controlled so that an electromagnetic attraction force (i.e., the force in the direction to close the valve member 131) substantially proportional to the duty ratio Dt acts on the plunger 132. The duty ratio Dt of the current through the exciting coil 133 is controlled by a later-described control unit 26 (FIGS. 1 and 4).

Since the electromagnetic type displacement control valve 110 is thus constructed, the valve member 131 is displaced rightward of FIG. 3 to reduce the sectional area of the opening of the control pressure passage 140. If the duty ratio Dt is enlarged to strengthen the valve closing force of the valve member 131, the pressure in the swash plate chamber 106 lowers to reduce the inclination angle θ of the swash plate 103 to increase displacement.

If the duty ratio Dt is reduced to weaken the valve closing force, contrarily, the valve member 131 is displaced leftward in FIG. 3 by the coil spring 135 to enlarge the sectional area of the opening of the control pressure passage 140. As a result, the pressure in the swash plate chamber 106 rises to enlarge the inclination angle θ of the swash plate 103 so that the displacement decreases.

In FIG. 1, the electric air-conditioning electronic control unit (the "ECU") 26 includes a microcomputer and peripheral circuits. According to its programming, the ECU 26 performs arithmetic operations for input signals to control the electromagnetic clutch 11, the two electromagnetic valves 13 and 21, the electromagnetic displacement control valve 110 and other electric devices (14a, 23, 25 and so on).

Next, FIG. 4 is an electric control block diagram of the first embodiment including the ECU 26. Detection signals are input to ECU 26 from a group of sensors. Such sensors include a compartment temperature sensor 30 for detecting the internal temperature in the compartment; an ambient temperature sensor 31 for detecting ambient temperature; a solar radiation sensor 32 for detecting solar radiation into the compartment; a temperature sensor 33 of evaporator 18; a water temperature sensor 34 of the vehicle engine 12; a differential pressure sensor 35 for the discharge side of the compressor 10 of the freezing cycle; and so on.

here, the temperature sensor 33 of the evaporator 18 is arranged just downstream from the airflow of the evaporator 18, as shown in FIG. 1, for detecting the air temperature from the evaporator 18. On the other hand, the differential pressure sensor 35 is arranged between the discharge side of the compressor 10 and the upstream side of the two electromagnetic valves 13 and 21, as shown in FIG. 1.

Figure 5:
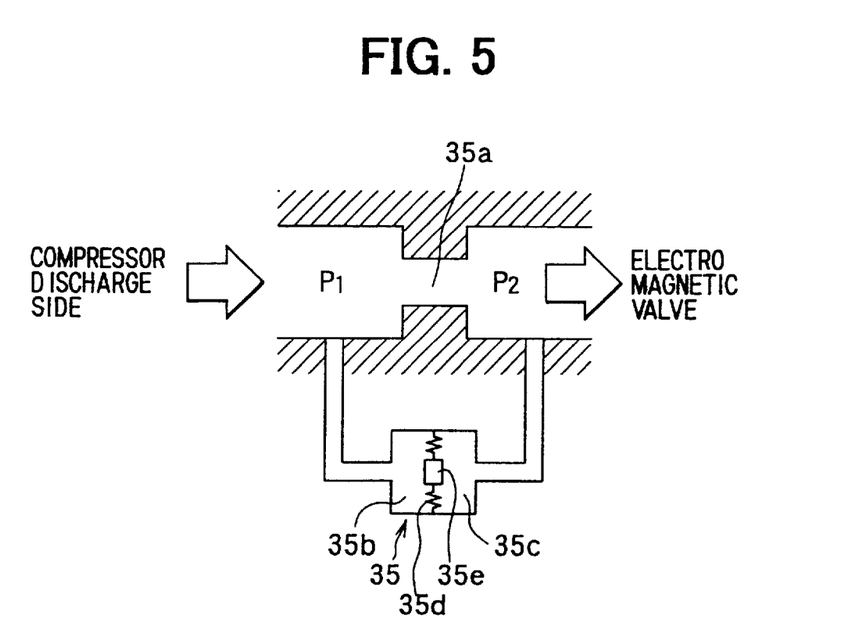
FIG. 5 is a cross-sectional diagram of a differential pressure sensor portion of the first embodiment.

The differential pressure sensor 35 will be described more specifically. Between the discharge side of the compressor 10 and the upstream side of the two electromagnetic valves 13 and 21, as shown in FIG. 5, a fixed throttle 35a such as an orifice is disposed, and refrigerant pressures P1 and P2 across the throttle 35a are introduced into two pressure chambers 35b and 35c of the differential pressure sensor 35. a semiconductor strain gauge 35e is attached to a diaphragm 35d that partitions pressure chambers 35b and 35c.

Moreover, the diaphragm portion 35d is deformed in response to the differential pressure, ΔP (=P1−P2) across throttle 35a of pressure chambers 35b and 35c. As a result, the strain of the semiconductor strain gauge 35e changes to vary the electric resistance of the semiconductor strain gauge 35e. To the ECU 26, the voltage change is input based on change of electric resistance.

The aforementioned differential pressure sensor 35 detects refrigerant flow rate so that the refrigerant flow rate can be calculated from the following Formula 1 based on the differential pressure ΔP (=P1−P2) across the throttle 35a.

Flow Rate $Gr = C \cdot A \cdot (2 \cdot g \cdot \rho_H \cdot \Delta P)^{1/2}$, [Formula 1]

wherein:

C: the flow coefficient of the throttle 35a;

A: the opening area of the throttle 35a;

g: the gravitational acceleration;

$\rho_H$: the inlet refrigerant density of the throttle 35a.

On the other hand, control signals from a group of control switches 41 to 45 of an air conditioner control panel 40, as disposed in the vicinity of the instrument panel, are input into the ECU 26. This control switch group includes the hot gas switch (or auxiliary heating switch) 41 for issuing a drive signal for the heating mode by the hot gas bypass; the mode changing switch 42 for changing the blow modes (i.e., the face, bi-level, foot and defroster modes); the temperature setting switch 43 for issuing a set signal of the compartment temperature; the air conditioner switch 44 for issuing the running signal for the cooling mode; the air flow changing switch 45 for changing the air flow of the blower 23; and so on.

The operation of the first embodiment is now described. First, the operations of the freezing cycle will be summarized. When the air conditioner switch 44 is turned ON to issue the running signal for the cooling mode, the cooling electromagnetic valve 13 is opened by the ECU 26, and the heating electromagnetic valve 21 is closed. The electromagnetic clutch 11 is applied so that vehicular engine drives compressor 10.

As a result, discharged gas refrigerant from compressor 10 flows through the cooling electromagnetic valve 13 in the open state into the condenser 14, where it is cooled and condensed. Then, the condensed liquid refrigerant is gas-liquid separated by a receiver 15 so that only the liquid refrigerant is evacuated into a gas-liquid two-phase state at low temperature and low pressure. This is done by temperature type expansion valve 16.

Next, this low-pressure refrigerant flows through the check valve 17 into the evaporator 18 and evaporated by absorbing heat from air blown from the blower 23. The air, cooled in the evaporator 18, is blown into the compartment for cooling. The gas refrigerant thus evaporated in the evaporator 18 and drawn through the accumulator 19 into the compressor 10 and compressed.

In winter, however, the hot gas switch 41 is turned ON to issue the running signal for the heating mode. Then, the cooling electromagnetic valve 13 is closed by the ECU 26 so that the heating electromagnetic valve 21 opens the hot gas bypass passage 20 thereby to set the heating mode.

As a result, the electromagnetic clutch 11 is applied. When the compressor 10 is driven by the vehicular engine 12, the high-temperature discharge gas refrigerant (or the overheated gas refrigerant) of the compressor 10 is pressure-reduced through the heating electromagnetic valve 21 in the open state by the throttle 21a and flows into the evaporator 18. During this time, the check valve 17 prevents the gas refrigerant from flowing from the hot gas bypass passage 20 to the temperature type expansion valve 16. And, the overheated gas refrigerant, after being reduced in pressure by the throttle 21a, releases its heat to the blown air through the evaporator 18 for heating. Here, the heat released from the gas refrigerant corresponds to the compression workload of the compressor 10. If, at this time, the hot water temperature of the engine 12 is raised to a certain extent, the blown air can be further heated in the hot water type heat exchanger for heating 24 by feeding the hot water to the heat exchanger 24 through the hot water valve 25.

The gas refrigerant having released its heat in the evaporator 18 is drawn through the accumulator 19 and compressed by the compressor 10. During heating in winter, ambient air is ordinarily introduced into the air conditioner casing 22 to defog the windshield.

Figure 6:
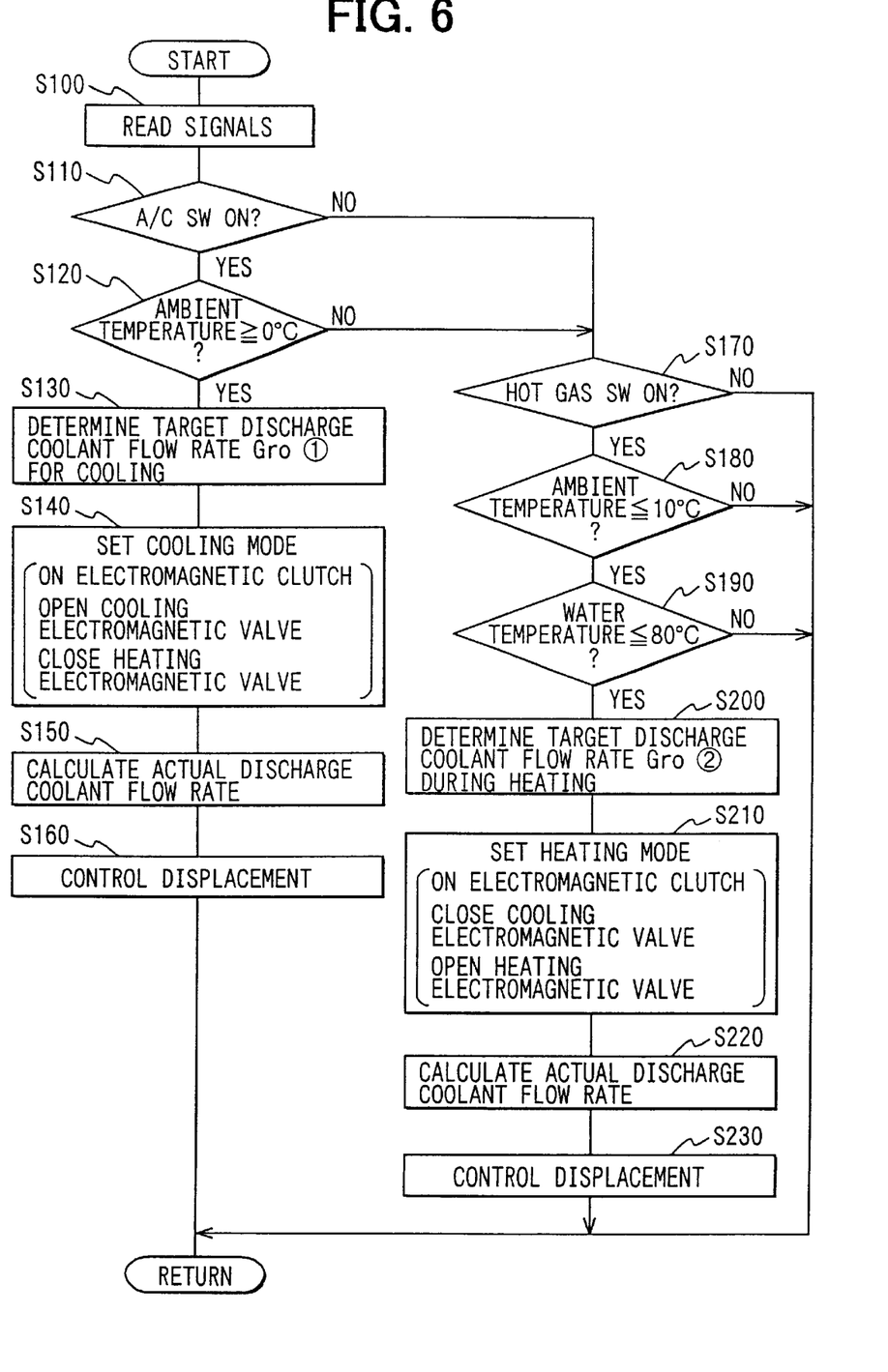
FIG. 6 is a flow chart showing the heating and cooling ability controls of the first embodiment.

In FIG. 6, cooling ability control in the first embodiment and heating ability control by the hot gas heater function will be described. The control routine of FIG. 6 is started, for example, by turning ON the (not-shown) ignition switch of the vehicular engine 12. At Step S100, signals from the individual sensors 30 to 35 and the control switches 41 to 45 of the air conditioner control panel 40 are read. Next, at Step S110, whether or not the air conditioner switch 44 is ON is determined. When the air conditioner switch 44 is ON (that is, when a running signal for the cooling mode is issued), the routine advances to Step S120, where whether or not the ambient temperature Tam is at a first predetermined value (e.g., 0° C.) or higher is determined. When it is lower the first predetermined value, no cooling is necessary, and the routine advances to a later-described Step S170. When the ambient temperature Tam exceeds the first predetermined value, the routine advances to Step S130, where a target discharge cooling flow rate Gro(1) during cooling is determined.

This target discharge refrigerant flow rate Gro (1) is determined such that the temperature Te of the evaporator 18 is a predetermined target temperature TEO (e.g., 0° C.). Specifically, the refrigerant flow rate Gro (1) is determined by the feedback control (e.g., the PI control or the PID control) which is based on the evaporator temperature Te detected by the temperature sensor 33 and the information (e.g., the inlet air temperature of the evaporator or the suction flow rate of the evaporator) indicating the cooling load. Therefore, the target discharge refrigerant flow rate Gro (1) is raised, when the actual evaporator temperature Te is higher than the target temperature TEO as during a transition time after cooling begins, but is lowered when the actual evaporator temperature Te is in the vicinity of the target temperature TEO as during steady cooling.

Next, the routine advances to Step S140, where the freezing cycle is set to the cooling mode state. Here, the electromagnetic clutch 11 is turned ON; the cooling electromagnetic valve 13 is opened; and the heating electromagnetic valve 21 is closed. Next, the routine advances to Step S150, where the actual discharge refrigerant flow rate Gr is calculated by the aforementioned Formula 1 based on the differential pressure ΔP, as detected by the differential pressure sensor 35, across the throttle 35a on the compressor discharge side.

Next, the routine advances to Step S160, where the displacement of the compressor 10 is controlled by determining the duty ratio Dt of the electric current through the exciting coil 133 of the electromagnetic type displacement control valve 110 based on the aforementioned actual discharge refrigerant flow rate Gr, as calculated, and the target discharge refrigerant flow rate Gro (1).

When cooling begins, however, the duty ratio Dt is always maximized to feed the maximum current (e.g., 1A) to the exciting coil 133 of the electromagnetic type displacement control valve 110, so that the valve member 131 is displaced to the maximum rightward position in FIG. 3. this fully closes the control pressure passage 140. As a result, the inclination angle θ of the swash plate 103 is minimized by the reduction of pressure in the swash plate chamber 106 so that the displacement of the compressor 10 is maximized. When cooling begins, therefore, compressor 10 can be operated with the maximum displacement so that the ability of the compressor 10 is maximized to lower the evaporator temperature quickly.

The compressor 10 is operated at maximum displacement only for a predetermined time period from when cooling begins. After a predetermined time lapse, the duty ratio Dt is determined to control the displacement of the compressor 10 such that the aforementioned actual discharge refrigerant flow rate Gr is the target discharge refrigerant flow rate Gro (1). By feedback control (e.g., the PI control or the PID control) based on the actual discharge refrigerant flow rate Gr, more specifically, a duty ratio Dt is determined for achieving the target discharge refrigerant flow rate Gro (1). When the actual discharge refrigerant flow rate Gr exceeds the target discharge refrigerant flow rate Gro (1) as the compressor speed (or the engine speed) rises, for example, the duty ratio Dt is reduced to augment the opening of the control pressure passage 140. Therefore, the pressure in the swash plate chamber 106 is raised to increase the inclination angle θ of the swash plate 103 thereby to reduce the displacement of the compressor 10.

With this compressor displacement control, the compressor discharge refrigerant flow rate Gr is kept at the target discharge refrigerant flow rate Gro (1) to control cooling to keep the evaporator temperature at the target temperature TEO. When step S110 determines that the air conditioner switch 44 is OFF and step S120 determines that the ambient temperature Tam is lower than the first predetermined value (e.g., 0° C.), contrarily, the routine advances to Step S170, where whether or not the hot gas switch 44 is ON is determined.

When the hot gas switch 44 is ON (that is, when the running signal of the hot gas heating mode is issued), the routine advances to Step S180, where whether or not the ambient temperature Tam is at a second predetermined value (e.g., 10° C.) or lower is determined. When the ambient temperature Tam is at the second predetermined value (e.g., 10° C.) or lower, step S190 determines whether or not the engine water temperature Tw is at a predetermined value (e.g., 80° C.) or lower.

When both the ambient temperature Tam and the engine water temperature Tw are at the predetermined values or lower, the hot gas heating mode is required. At Step S200, therefore, the target discharge refrigerant flow rate Gro (2) is determined.

During the hot gas heating mode, the heating ability depends upon a freezing cycle high pressure PH. Therefore, the target discharge refrigerant flow rate Gro (2) during heating is determined such that the freezing cycle high pressure PH may be a predetermined target pressure (e.g., 20 Kg/cm²G). This target pressure is determined considering that the cycle components may be prevented from being damaged by the abnormal rise in the high pressure PH.

During heating by the hot gas heater, the discharge gas refrigerant from the compressor 10 is decompressed by the fixed throttle 21a and is introduced directly into the evaporator 18 so that the discharge refrigerant flow rate (i.e., the differential pressure ΔP0 of the compressor 10 and the high pressure PH) have a generally one-to-one corresponding relation. Therefore, the target discharge refrigerant flow rate Gro (2) during heating may be a preset pressure but need not be determined by the feedback control. Next, at Step S200, the hot gas heating mode is set by turning the electromagnetic clutch 11 ON, by closing the cooling electromagnetic valve 13 and by opening the heating electromagnetic valve 21. Next, at Step S220, the actual discharge refrigerant flow rate Gr is calculated by the foregoing Formula 1 based on the differential pressure ΔP, as detected by the differential pressure sensor 35, across the throttle 35a on the compressor discharge side. Next, at Step S230, the displacement of the compressor 10 is controlled by determining the duty ratio Dt of the electric current of the exciting coil 133 of the electromagnetic type displacement control valve 110 based on the actual discharge refrigerant flow rate Gr, as calculated, and the target discharge refrigerant flow rate Gro (2).

At the start of heating, the duty ratio Dt is always maximized, similar to cooling, to feed the maximum current (e.g., 1 A) to the exciting coil 133 of the electromagnetic type displacement control valve 110 so that the valve member 131 is displaced to the maximum rightward of FIG. 3 to fully close the control pressure passage 140. As a result, the inclination angle θ of the swash plate 103 is minimized by the reduction of the pressure in the swash plate chamber 106 so that the displacement of the compressor 10 is maximized. Therefore, at the start of heating, the compressor 10 is operated with the maximum displacement so that the heat release of the evaporator 18 is quickly raised.

Only for a predetermined time period from the start of heating, the compressor 10 is operated with the maximum displacement. After lapse of the predetermined time period, the duty ratio Dt is determined to control the displacement of the compressor 10 such that the aforementioned actual discharge refrigerant flow rate Gr is the target discharge refrigerant flow rate Gro (2). By the feedback control (e.g., the PI control or the PID control) based on the actual discharge refrigerant flow rate Gr, the duty ratio Dt is determined for achieving the target discharge refrigerant flow rate Gro (2).

When the actual discharge refrigerant flow rate Gr exceeds the target discharge refrigerant flow rate Gro as the compressor speed (or the engine speed) rises, for example, the duty ratio Dt is reduced to augment the opening of the control pressure passage 140. Therefore, the pressure in the swash plate chamber 106 is raised to increase the inclination angle θ of the swash plate 103 thereby reducing the displacement of the compressor 10. Accordingly, compressor discharge refrigerant flow rate Gr is kept at the target discharge refrigerant flow rate Gro even during heating to control heating and keep the freezing cycle high pressure PH at a predetermined pressure. Therefore, cooling and heating is controlled by controlling the displacement of the compressor 10 so that the target discharge refrigerant flow rate may be obtained by using the electromagnetic type displacement control valve 110 common between cooling and heating modes.

Here, in the foregoing embodiment, the target discharge refrigerant flow rate Gro (2) during heating is determined so that the freezing cycle high pressure PH may take the predetermined target pressure (e.g., 20 Kg/cm$^2$G). However, this target pressure need not be fixed at the constant value but may vary with the information (e.g., the ambient temperature or the compartment temperature) indicating the heating load. Specifically, the target pressure is raised, if the heating load rises, but is lowered if the heating load drops. Thus, heating can be controlled according to the heating load.

(Second Embodiment)

In the first embodiment thus far described, between the discharge side of the compressor 10 and the upstream side of the two electromagnetic valves 13 and 21, the fixed throttle 35a, such as an orifice, is disposed. The differential pressure ΔP is detected thereacross by the differential pressure sensor 35, and the refrigerant flow rate on the discharge side of the compressor 10 is detected based on the differential pressure ΔP, thereby controlling the displacement of the compressor 10. In the second embodiment, on the other hand, a throttle portion is built in the compressor 10 to mechanically control the displacement by the differential pressure established at the built-in throttle portion.

Figure 7:
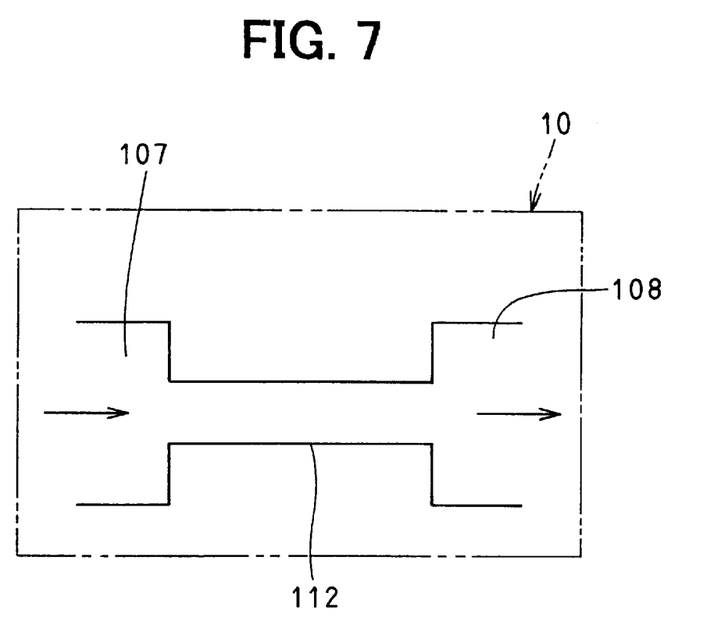
FIG. 7 is a diagram of a built-in throttle portion in a compressor of a second embodiment.

In the second embodiment, as shown in FIG. 7, the first discharge chamber 107 for collecting and recovering the discharged refrigerant from the individual working chambers Vc of FIG. 2 and the second discharge chamber 108 for introducing the refrigerant in the first discharge chamber 107 to the discharge port 109 communicate via a throttle communication passage (or throttle portion) 112 having a predetermined throttle hole diameter. Therefore, when refrigerant passes through the throttle communication passage 112, a pressure loss occurs so that the pressure in the second discharge chamber 108 is lower than in the first pressure chamber 107. Accordingly, the throttle communication passage 112 operates similar to the fixed throttle 35a of the first embodiment so that the refrigerant flow rate can be acquired from the differential pressure ΔP across that throttle communication passage 112.

In the second embodiment, on the other hand, as the throttle portion is built in the compressor 10, the differential pressure sensor 35 of the first embodiment is replaced by a pressure sensor 350 (FIG. 8) disposed on the discharge side of the compressor 10 for detecting the high pressure on the discharge side of the compressor 10.

Figure 9:
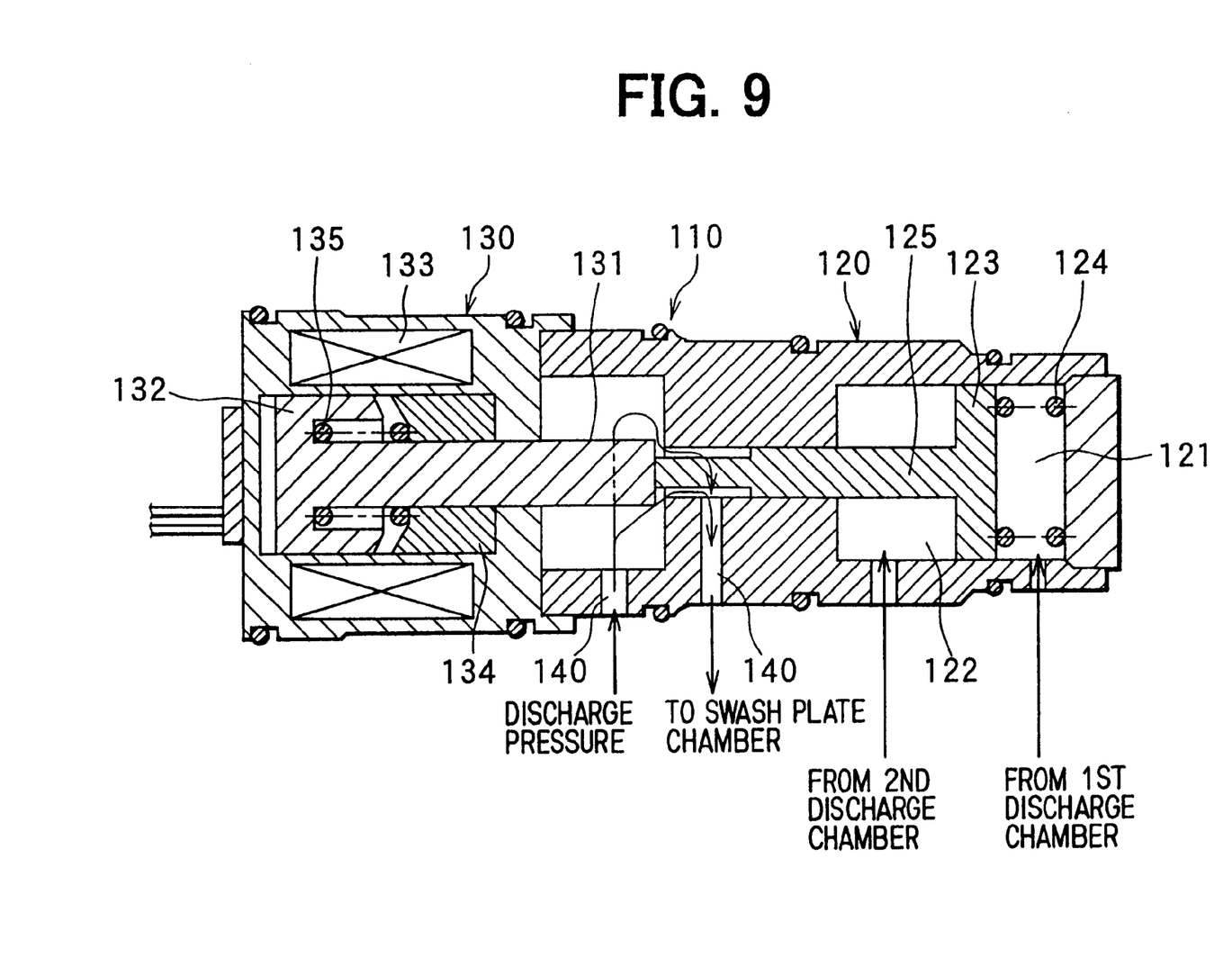
FIG. 9 is a longitudinal cross-sectional view of a displacement control valve mechanism of the compressor of the second embodiment.

FIG. 9 shows a specific example of the electromagnetic type displacement control valve 110 according to the second embodiment. This control valve 110 is constructed of a first control portion 120 that controls the differential pressure ΔP between the first discharge chamber 107 and the second discharge chamber 108, in the compressor 10, to a predetermined differential pressure ("target differential pressure") ΔP; and a second control portion 130 that regulates the first control portion 120 to set the target differential pressure ΔP0.

First control portion 120 has a first control chamber 121 into which the pressure in the first discharge chamber 107 a second control chamber 122 into which the pressure in the second discharge chamber 108 is introduced. Moreover, these control chambers 121 and 122 are partitioned by a movable partition member 123, and first control chamber 121 has a coil spring 124 that exhibits an elastic force that pushes the partition member 123 in the direction that enlarges the volume of the first control chamber 121.

On a push rod 125, formed integrally with the partition member 123, a force from the pressure difference (i.e., the aforementioned differential pressure ΔP) between the two control chambers 121 and 122 and the elastic force of the coil spring 124 acts. This force (the "valve opening force") is directed leftward in FIG. 9 to augment the volume of the first control chamber 121 because the pressure in the first control chamber 121 is higher than in the second control chamber 122. Here, push rod 125 movement is so small that the force coil spring 124 exerts upon the partition member 123 (or the push rod 125) is a generally constant value.

On the other hand, the second control portion 130 exerts a force (the "valve closing force") against the valve opening force upon the valve member 131. Valve member 131 controls the communicating state (or the opening) of the control pressure passage 140 for introducing the discharge pressure (or the pressure of the second discharge chamber 108) of the compressor 10 into the swash plate chamber 106. The plunger (or the movable iron core) 132, the exciting coil 133, the stationary magnetic pole member (or the stationary iron core) 134 and the coil spring (or the elastic member) 135 can be the same as the electromagnetic type displacement control valve 110 of the first embodiment.

By controlling the duty ratio of the electric current fed to the exciting coil 133 by the ECU 26, the valve closing force can be generally proportional to the duty ratio. When the duty ratio is enlarged to raise the valve closing force, the valve member 131 is moved rightward in FIG. 9 to throttle the control pressure passage 140 so that the pressure in the swash plate chamber 106 is lowered to augment the displacement of the compressor 10. When the duty ratio is reduced to reduce the valve closing force, the valve member 131 moves leftward in FIG. 9 to open the control pressure passage 140 so that the pressure in the swash plate chamber 106 rises to reduce the displacement of the compressor 10.

When the speed of the engine rises to raise the speed of the compressor 10, the discharge refrigerant flow rate of the compressor 10 is accordingly raised. With this rise, however, the differential pressure ΔP between the first and second control chambers 121 and 122 increases to enlarge the valve opening force. Therefore, the push rod 125 and the valve member 131 move leftward in FIG. 9 and open the control pressure passage 140, reducing the displacement of the compressor 10.

When the speed of the engine slows, reducing compressor 10 speed, the discharge refrigerant flow rate of the compressor 10 is lowered. With this flow rate reduction, the differential pressure ΔP between the first and second control chambers 121 and 122 decreases to lower the valve opening force. Therefore, the push rod 125 and the valve member 131 move rightward in FIG. 9 to throttle the control pressure passage 140 so that the displacement of the compressor 10 goes up.

At this time, the push rod 125 and the valve member 131 positions where the valve closing force and the valve opening force are balanced. Since the forces by the coil springs 124 and 135 are constant, the movements of the push rod 125 and the valve member 131 to the balanced position between the valve closing force and the valve opening force imply that the displacement of the compressor 10 is mechanically changed till the differential pressure $\Delta P$ between the first and second control chambers 121 and 122 becomes the predetermined differential pressure. Specifically, the target differential pressure $\Delta P0$ is determined by the valve closing force.

Thus, by the differential pressure $\Delta P$ between the first and second control chambers 121 and 122, the displacement of the compressor 10 is directly varied mechanically and responsively to abrupt fluctuations of engine (or compressor 10) speed. Specifically, the electric displacement control of the compressor 10 as in the first embodiment cannot avoid the various response delays accompanying the electric controls. According to the second embodiment, however, the displacement is directly varied by the mechanical operations using the differential pressure $\Delta P$ so that the responsiveness of the displacement variation to the discharge refrigerant flow rate can be improved.

As described above, the target differential pressure $\Delta P0$, as determined by the valve closing force (or the electromagnetic attraction), can be varied by the duty ratio control. Independent of engine speed change (or compressor 10), the displacement can be varied by the change in target differential pressure $\Delta P0$ to vary the refrigerant flow rate discharged from compressor 10.

Figure 10:
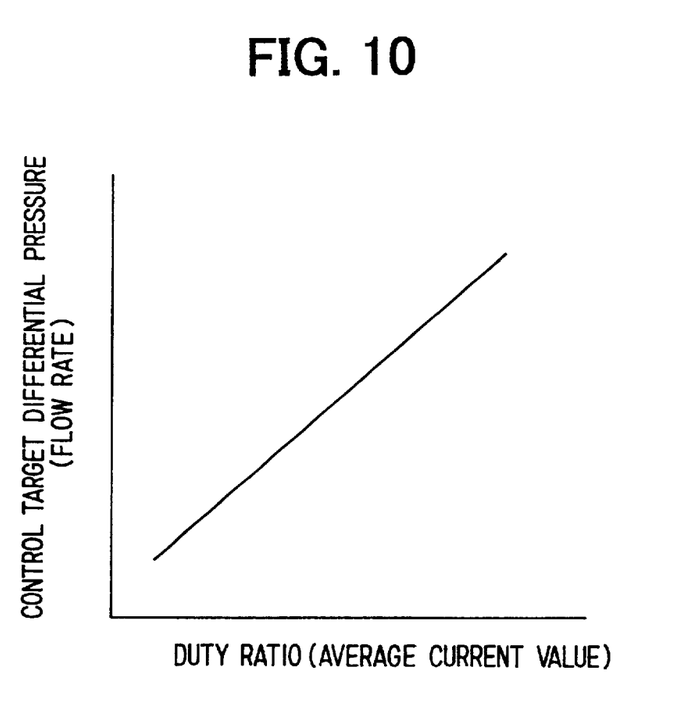
FIG. 10 an operation characteristic diagram of the displacement control valve mechanism of the second embodiment.
Figure 11:
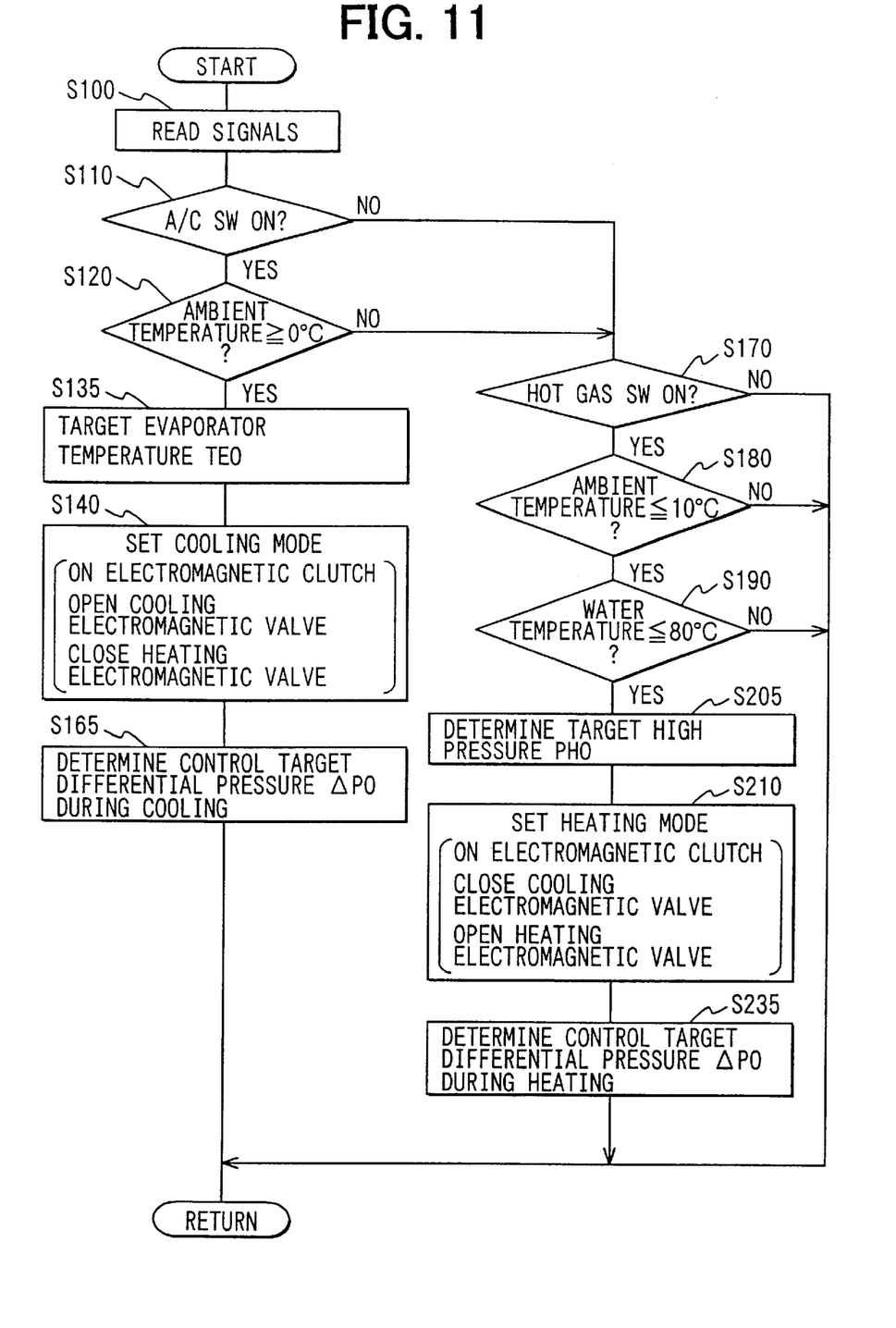
FIG. 11 is a flow chart showing the heating and cooling ability controls of the second embodiment.

In the second embodiment, therefore, the determination of the duty ratio of the exciting coil 133 is to determine the target differential pressure $\Delta P0$ and accordingly to determine the control target flow rate. Therefore, the target differential pressure $\Delta P0$ (i.e., the control target flow rate) is proportional to the duty ratio (i.e., the average current of the exciting coil) as shown in FIG. 10. Next, FIG. 11 shows a cooling control by the second embodiment and a heating control by the hot gas heater function. In FIG. 11, the operations of the same Steps S100 to S120, S140, S170 to S190 and S210 as those of FIG. 6 are identical to those of the first embodiment so that their description will be omitted.

Step S135 determines the target evaporator temperature TEO during cooling. This target evaporator temperature TEO is determined at a predetermined value 0° C., for example, but may be varied according to the information (e.g., the target blow temperature TAO necessary for keeping the inside of the compartment at a preset value Tset, or the ambient temperature Tam) indicating the cooling load.

At Step S165, the target differential pressure $\Delta P0$ during cooling is determined. Specifically, the duty ratio is determined such that the actual evaporator temperature Te detected by the temperature sensor 33 can be set to the target evaporator temperature TEO, thereby determining the target differential pressure $\Delta P0$ for the compressor displacement control. If the actual evaporator temperature Te exceeds the target evaporator temperature TEO of Step S135, the duty ratio in the electromagnetic type displacement control valve 110 is enlarged to raise the valve closing force and accordingly the target differential pressure $\Delta P0$, as shown in FIG. 10. In the control valve 110, therefore, the valve member 131 moves rightward in FIG. 9 to throttle the control pressure passage 140 so that the pressure in the swash plate chamber 106 falls to augment the displacement of the compressor 10.

If the actual evaporator temperature Te is exceeded by the target evaporator temperature TEO of Step S135, on the contrary, the duty ratio in the electromagnetic type displacement control valve 110 is reduced to reduce the valve closing force and accordingly the target differential pressure $\Delta P0$, as shown in FIG. 10. therefore, the valve member 131 moves leftward in FIG. 9 to open the control pressure passage 140 so that the pressure in the swash plate chamber 106 rises to reduce the displacement of the compressor 10.

Thus, the target differential pressure $\Delta P0$ is made so variable that the actual evaporator temperature Te can be set to the target evaporator temperature TEO, and the displacement is directly mechanically controlled to control the refrigerant flow rate such that the differential pressure $\Delta P$ across the throttle communication passage 112 in the compressor 10 is the aforementioned target differential pressure $\Delta P0$.

During the hot gas heating mode, on the other hand, at Step S205, a target high pressure PHO is determined to be the predetermined pressure (e.g., 20 Kg/cm$^2$G). At Step S235, moreover, the target differential pressure $\Delta P0$ during heating is determined. Specifically, the target differential pressure $\Delta P0$ during heating is determined by determining the duty ratio so that the actual high pressure PH to be detected by the pressure sensor 350 can be set to the target high pressure PHO.

If the actual high pressure PH is exceeded by the target high pressure PHO, the duty ratio in the electromagnetic type displacement control valve 110 is enlarged to augment the valve closing force thereby to augment the target differential pressure $\Delta P0$, as shown in FIG. 10. In the control valve 110, therefore, the valve member 131 is moved rightward in FIG. 9 to throttle the control pressure passage 140 so that the pressure in the swash plate chamber 106 falls to augment the displacement of the compressor 10.

If the actual high pressure PH exceeds the target high pressure PHO, on the contrary, the duty ratio in the electromagnetic type displacement control valve 110 is reduced to weaken the valve closing force thereby to lower the target differential pressure $\Delta P0$, as shown in FIG. 10. therefore, the valve member 131 is moved leftward in FIG. 9 to open the control pressure passage 140 so that the pressure in the swash plate chamber 106 rises to reduce the displacement of the compressor 10.

Thus, the target differential pressure $\Delta P0$ is made variable such that the actual high pressure PH can be set to the target high pressure PHO, and the displacement is directly mechanically controlled to control the refrigerant flow rate such that the differential pressure $\Delta P$ across the throttle communication passage 112 is set to the aforementioned target differential pressure $\Delta P0$.

From the description thus far made, such as in the second embodiment, the cooling and heating abilities can be controlled, as in the first embodiment, by controlling the displacement of the compressor 10 using the electromagnetic type displacement control valve 110 common between the cooling mode and the heating mode.

(Other Embodiments)

The present invention should not be limited to the foregoing first and second embodiments but can be embodied in various modes.

(1) The control of the power supply to the exciting coil 133 of the electromagnetic type displacement control valve 110 should not be limited to the duty ratio control but can naturally be made such that the power current is directly controlled in an analogue manner.

(2) The compressor 10 can be exemplified by a variable displacement type other than the swash plate type compressor.

(3) The first embodiment has been described for where the differential pressure sensor 35 detects the refrigerant flow rate. However, the refrigerant flow rate may be detected by using another relation, in which the cooling degree of an exothermic wire disposed in the refrigerant passage varies with the refrigerant flow rate so that the electric resistance of the exothermic wire varies.

(4) The detection unit of the refrigerant flow rate can be arranged on the lower pressure side (i.e., between the inlet portion of the evaporator and the suction side of the compressor) of the cycle. Where the detection unit of the refrigerant flow rate is thus arranged on the lower pressure side of the cycle, it is preferable to select the refrigerant flow rate detection unit having a small pressure loss, as in (3).

Figure 8:
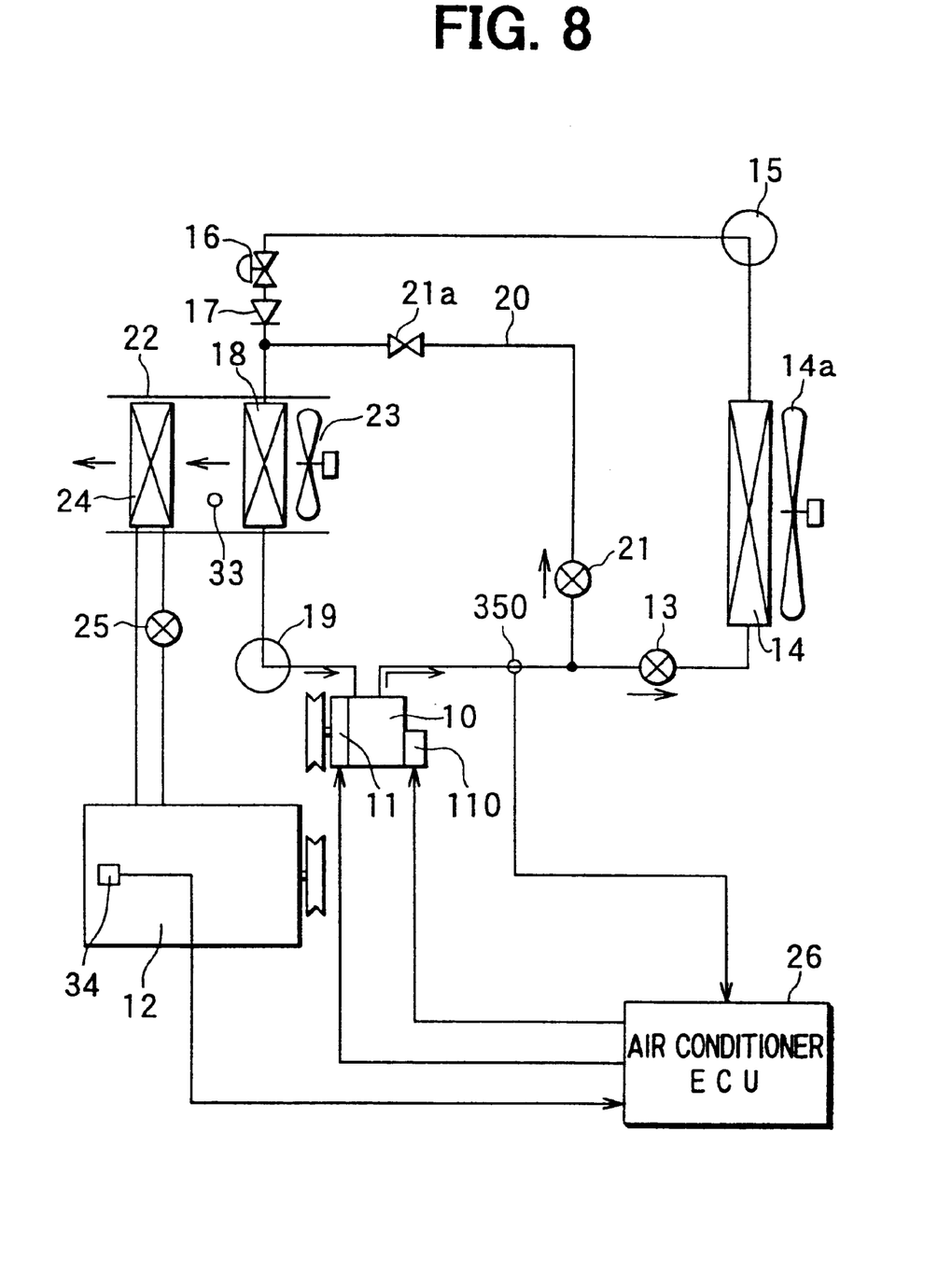
FIG. 8 is a schematic view of the second embodiment.

(5) In the freezing cycles of FIGS. 1 and 8, during the cooling mode, the circuit is constructed by combining the receiver 15 and the temperature type expansion valve 16. However, the circuit construction may be modified by eliminating the receiver 15 and by using a fixed throttle in place of the temperature type expansion valve 16.

(6) In the freezing cycles of FIGS. 1 and 8, the two cooling and heating electromagnetic valves 13 and 21 can be replaced by one valve device in which functions to interchange a plurality of passages are integrated.

(7) FIG. 4 has been described on the case, in which the air conditioner control panel 40 is provided with the dedicated switch as the hot gas switch 41 to be manually controlled by the passenger. However, this manually controlled dedicated switch 41 can be replaced by another switch means. Where the vehicle is provided with a heating manual switch for idling up the vehicle engine 12, for example, the heating mode by the hot gas bypass may be started in association with the ON of the engine heating manual switch.

While the above-described embodiments refer to examples of usage of the present invention, it is understood that the present invention may be applied to other usage, modifications and variations of the same, and is not limited to the disclosure provided herein.

What is claimed is:

1. A freezing cycle apparatus that switches between a cooling mode and a heating mode, wherein a low-pressure refrigerant is evaporated in an evaporator for cooling air during said cooling mode and a gas refrigerant from a discharge side of a compressor is introduced into said evaporator for heating during said heating mode, said freezing cycle apparatus comprising:

flow rate determining means for determining target flow rates of refrigerant in said cycle during heating and cooling modes;

flow rate detecting means for detecting the refrigerant flow rates during said heating mode and during said cooling mode;

said compressor being a variable displacement compressor;

displacement control means for controlling the displacement of said compressor so that the refrigerant flow rate detected by said flow rate detecting means is said target flow rate; and wherein displacement of said compressor is controlled such that the refrigerant flow rate in a cycle that circulates refrigerant for said cooling mode and said freezing mode reaches a predetermined target flow rate during said cooling mode or said heating mode.

2. A freezing cycle apparatus are set forth in claim 1, further comprising a valve means for switching refrigerant passages such that gas refrigerant on said discharge side of said compressor is introduced into said evaporator during said heating mode and into a condenser during said cooling mode; and said flow rate detecting means is arranged between the discharge side of said compressor and said valve means.

3. A freezing cycle apparatus as set forth in claim 2, wherein said flow rate detecting means includes a throttle portion on the discharge side of said compressor;

a differential pressure detecting means for detecting the differential pressure across said throttle portion; and a flow rate calculation means for calculating refrigerant flow rate based on detected differential pressure.

4. A freezing cycle apparatus that switches between a cooling mode and a heating mode, wherein a low-pressure refrigerant is evaporated in an evaporator for cooling air during said cooling mode and a gas refrigerant from a discharge side of a compressor is introduced into said evaporator for heating during said heating mode, said freezing cycle apparatus comprising:

said compressor being a variable displacement compressor; and wherein displacement of said compressor is controlled such that the refrigerant flow rate in a cycle that circulates refrigerant for said cooling mode and said freezing mode reaches a predetermined target flow rate during said cooling mode or said heating mode; and wherein said cooling mode and said predetermined target flow rate are determined such that a temperature of said evaporator is set to the target temperature.

5. A freezing cycle apparatus that switches between a cooling mode and a heating mode, wherein a low-pressure refrigerant is evaporated in an evaporator for cooling air during said cooling mode and a gas refrigerant from a discharge side of a compressor is introduced into said evaporator for heating during said heating mode, said freezing cycle apparatus comprising:

said compressor being a variable displacement compressor;

wherein displacement of said compressor is controlled such that that the refrigerant flow rate in a cycle that circulates refrigerant for said cooling mode and said freezing mode reaches a predetermined target flow rate during said cooling mode or said heating mode; and wherein said predetermined target flow rate is determined such that a cycle high pressure is set to the target pressure during said heating mode.

6. A freezing cycle apparatus that switches between a cooling mode and a heating mode, wherein a low-pressure refrigerant is evaporated in an evaporator for cooling air during said cooling mode and a hot gas heater introduces a gas refrigerant from a discharge side of a compressor into said evaporator during said heating mode, said freezing cycle apparatus comprising:

said compressor being a variable displacement compressor including a displacement control mechanism for controlling displacement of said compressor; and a throttle portion disposed on a discharge side of said compressor;

a differential pressure responding mechanism portion disposed in said displacement control mechanism for varying the displacement of said compressor according to a differential pressure across said throttle portion and the target differential pressure;

a target differential pressure setting portion disposed in said displacement control mechanism for setting said target differential pressure by establishing a force against the differential pressure across said throttle portion;

cooling time target differential pressure determining means for determining said target differential pressure during said cooling mode by varying force against the differential pressure across said throttle portion; and heating time target differential pressure determining means for determining said target differential pressure during said heating mode by varying the force against the differential pressure across said throttle portion.

7. A freezing cycle apparatus as set forth in claim 6, wherein said throttle portion is positioned in said compressor.

8. A freezing cycle apparatus as set forth in claim 6, wherein said target differential pressure is determined such that a temperature of said evaporator is set to the target temperature during said cooling mode.

9. A freezing cycle apparatus as set forth in claim 6, wherein said target differential pressure is determined such that the cycle high pressure is set to the target pressure during said heating mode.

10. A freezing cycle apparatus as set forth in claim 4, wherein the target temperature of said evaporator is varied according to the cooling load.

11. A freezing cycle apparatus as set forth in claim 5, wherein the target pressure of said cycle high pressure is varied according to the heating load.

12. A temperature adjusting cycle apparatus that switches between a cooling mode and a heating mode, said freezing cycle apparatus comprising:

a temperature control circuit having a variable displacement compressor, a condenser, and an evaporator, said temperature control circuit including a refrigerant passage between said compressor, said condenser, and said evaporator;

a valve positioned along said refrigerant passage, said valve diverting refrigerant from said compressor to said evaporator through said condenser during said cooling mode, said valve diverting refrigerant from said compressor to said evaporator and bypassing said condenser during said heating mode;

a flow rate sensor positioned along said refrigerant passage that detects a refrigerant flow rate in said cooling passage during said heating mode and said cooling mode; and a controller that determines a first target flow rate of said refrigerant through said temperature control circuit during said heating mode and determines a second target flow rate through said temperature control circuit during said cooling mode, said controller electrically communicating with said compressor and responsive to said flow rate sensor to adjust a displacement of said compressor to achieve said first target flow rate and said second target flow rate through said temperature control circuit.

13. A temperature adjusting apparatus as claimed in claim 12, wherein said first target flow rate and said second target flow rate are different.

* * * * *